(12) United States Patent
Misaji et al.

(10) Patent No.: US 6,508,343 B2
(45) Date of Patent: Jan. 21, 2003

(54) VIBRATION DAMPER

(75) Inventors: Kazuhito Misaji, Wako (JP); Kengo Okamura, Wako (JP); Yuji Kuruhara, Wako (JP); Keiichi Sunami, Wako (JP); Tsuyoshi Yamashita, Wako (JP); Akihiro Maejima, Wako (JP); Yoshihiro Noguchi, Wako (JP); Toru Nirei, Wako (JP); Rentaro Kato, Komaki (JP); Koichi Hasegawa, Komaki (JP)

(73) Assignees: Honda Giken Kogyo Kabushiki Kaisha, Tokyo (JP); Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/756,685

(22) Filed: Jan. 10, 2001

(65) Prior Publication Data

US 2001/0022256 A1 Sep. 20, 2001

(30) Foreign Application Priority Data

Jan. 18, 2000 (JP) .......................... 2000-008970
Feb. 29, 2000 (JP) .......................... 2000-053356

(51) Int. Cl.$^7$ ................................. F16F 7/10
(52) U.S. Cl. .................. 188/379; 267/141; 267/140.4
(58) Field of Search ................. 188/378, 379, 188/380; 248/566; 473/521; 428/71; 273/73 R; 267/137, 138, 139, 141, 141.1, 153, 151, 152, 140.4

(56) References Cited

U.S. PATENT DOCUMENTS

| | | | | |
|---|---|---|---|---|
| 3,845,827 A | * | 11/1974 | Schulin | 267/137 |
| 4,238,104 A | * | 12/1980 | Hamilton | 248/566 |
| 4,948,131 A | * | 8/1990 | Nakanishi | 273/73 R |
| 5,143,394 A | * | 9/1992 | Piana | 188/379 |
| 5,339,793 A | * | 8/1994 | Findley | 188/379 X |
| 5,766,720 A | * | 6/1998 | Yamagishi et al. | 428/71 |
| 6,203,455 B1 | * | 3/2001 | Scherubl | 473/521 |
| 6,296,416 B1 | * | 10/2001 | Oreans et al. | 403/220 |

FOREIGN PATENT DOCUMENTS

| | | |
|---|---|---|
| JP | 8-127347 | 5/1996 |
| JP | 10009335 A * | 1/1998 |
| WO | WO 00/14429 | 3/2000 |

* cited by examiner

Primary Examiner—Christopher P. Schwartz
Assistant Examiner—Melanie Torres
(74) Attorney, Agent, or Firm—Armstrong, Westerman & Hattori, LLP

(57) ABSTRACT

A vibration damper little depending on temperature, capable of damping plural resonance vibrations over a wide frequency region as well as damping a specific frequency vibration is provided. The vibration damper comprises a housing formed of a rigid material, having an internal space and fixed to a vibration transmitting member, an elastic body inserted in the internal space not bonded thereto with a gap in a direction of vibration of the housing, and a weight integrally supported by the elastic body so as not to touch the housing. The elastic body and the weight form a dynamic damper.

8 Claims, 9 Drawing Sheets

Fig.2 - a
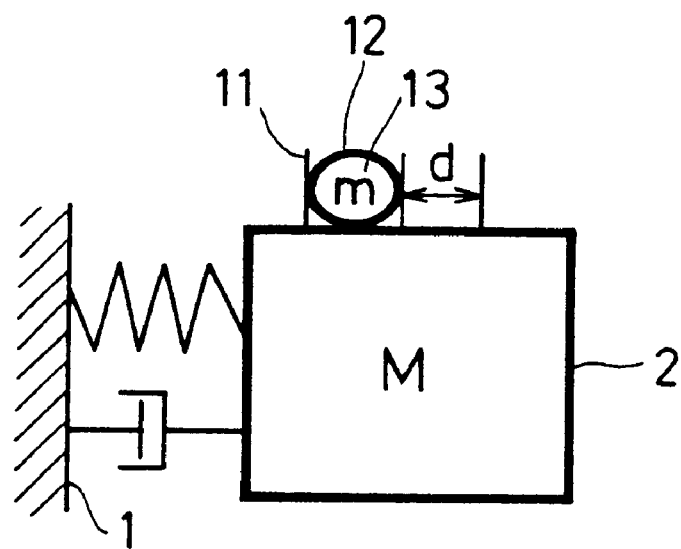
Fig.2 - b
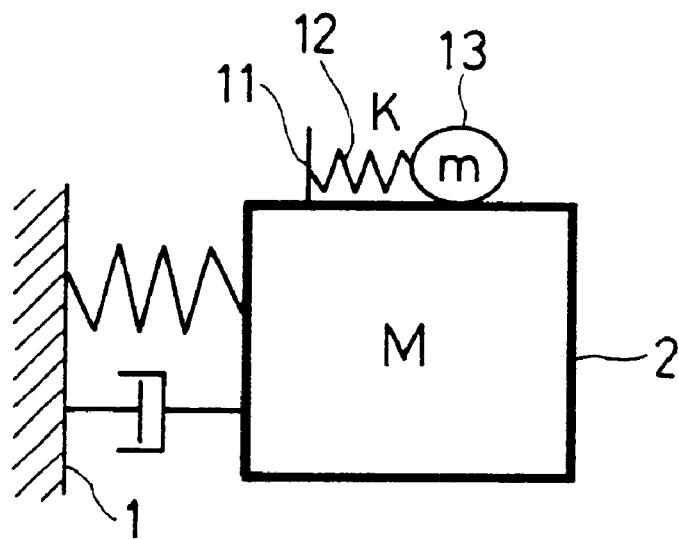

Fig.9-a
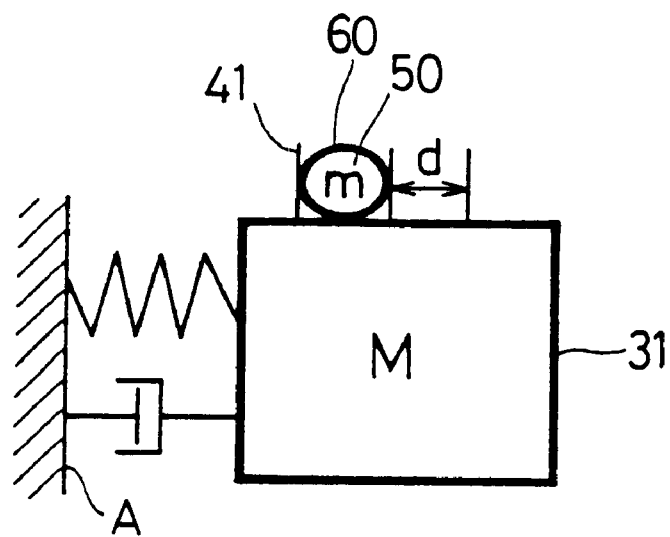
Fig.9-b
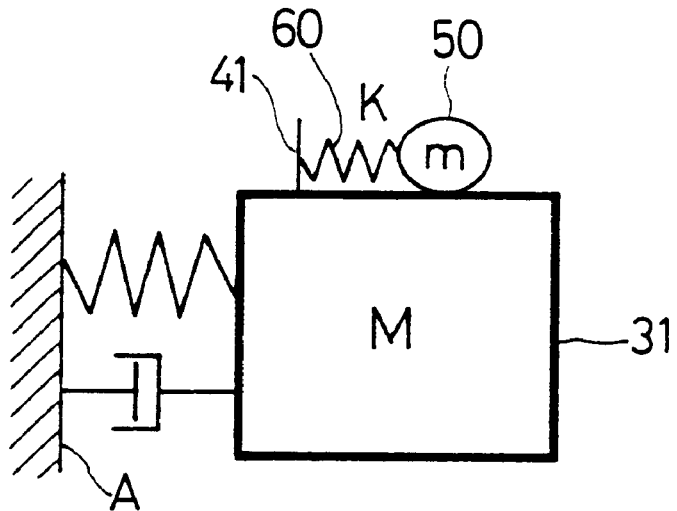

Fig.10-a
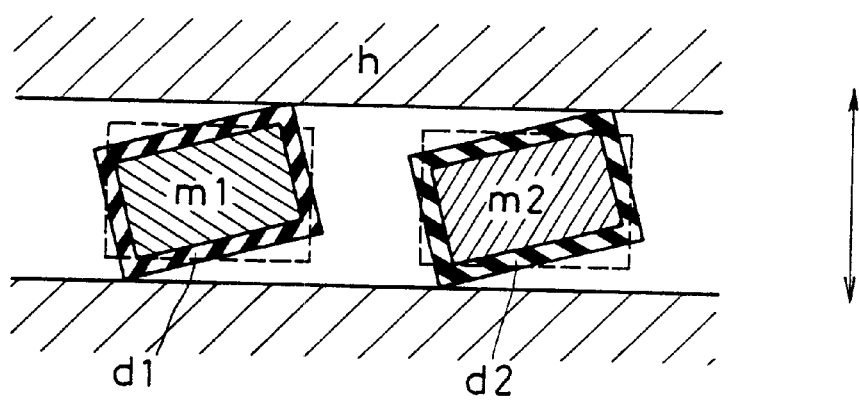
Fig.10-b
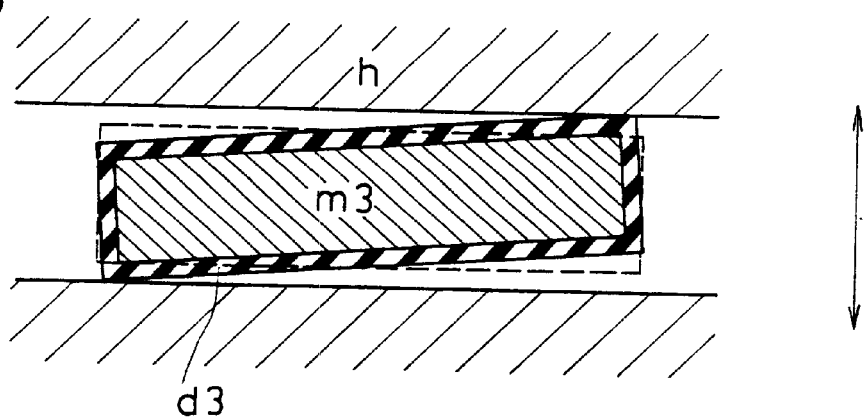

VIBRATION DAMPER

BACKGROUND OF THE INVENTION

The present invention relates to a vibration damper for preventing vibration occurring on a vibration transmitting member such as various function members, frame members or the like.

For example, in a vehicle such as a motorcar, vibration of a vibration source such as an internal combustion engine or vibration caused by a road surface is transmitted to the whole vehicle body, and if a vibration transmitting member such as a function instrument attached to a body frame resonates, lowering of function or noise occurs.

Therefore, in order to suppress vibration transmitted to the vibration transmitting member, usually the vibration transmitting member is attached with a mass damper, a dynamic damper or a vibration damping device.

In the mass damper, a weight is added to the vibration transmitting member to change the natural frequency, therefore it is necessary to increase weight of the weight in order to obtain sufficient vibration reducing effect, so that weight of the vehicle body increases.

In the dynamic damper, a frequency to be suppressed is specified by spring constant of an elastic body and weight of a weight. Therefore, the dynamic damper is not effective to vibration having a plurality of resonance frequencies.

The vibration damping device comprises a plate-like vibration transmitting member and a layer or several layers of sheet-like elastic member stuck on the vibration transmitting member. In this device, the elastic member must be stuck over a somewhat large area to obtain an effect, vibration reducing function is dependent on temperature largely and sometimes the vibration damping function is lowered owing to temperature.

In a vibration damper of a former application (International Application PCT/JP98/05530), a filling at least partly made of an elastic material is inserted in an internal space of a housing fixed to a vibration transmitting member with a gap not bonded to the housing. According to this vibration damper, since vibration is reduced owing to energy loss caused by sliding friction and impact when the filling touches an inner surface of the housing, plural resonance vibrations of different frequencies can be suppressed effectively. Further, the vibration damping owing to energy loss by sliding friction and impact is little influenced by temperature. The vibration damping effect becomes larger as the impact speed increases, therefore the damping effect is obtainable especially at a resonance region of high frequency. Accordingly, regarding a low resonance frequency, the vibration damping effect can not be expected so much. Also the vibration damper is not effective when it is intended that plural resonance vibrations are damped and a specific frequency is damped particularly largely.

Japanese Laid-Open Patent Publication Hei 8-127347 discloses an example for suppressing vibration of a steering wheel by a dynamic damper. However, management of resonance frequency deviation on mass-production is not easy.

SUMMARY OF THE INVENTION

The present invention has been accomplished in view of the foregoing and an object of the invention is to provide a vibration damper little depending on temperature capable of damping plural resonance vibrations over a wide frequency region as well as damping a specific frequency vibration. Another object of the invention is to provide a vibration damper capable of reducing deviation of resonance frequencies on mass-production and suppressing vibration of a steering wheel effectively.

In order to achieve the above objects, the present invention provides a vibration damper, comprising: a housing formed of a rigid material, having an internal space and fixed to a vibration transmitting member; an elastic body inserted in the internal space not bonded to the housing with a gap in a direction of vibration of the housing; and a weight integrally supported by the elastic body so as not to touch the housing, thereby the elastic body and the weight form a dynamic damper.

Owing to the construction that the elastic body is inserted in the inner space of the housing, vibration is damped based on energy loss caused by sliding friction and impact occurring when the elastic body touches the inner surface of the housing. Therefore, vibration damping effect is obtainable regarding plural resonance vibrations of different frequencies and dependence on temperature is small.

A resonance vibration in a specific frequency region which can not be damped by the above construction or a resonance vibration wanted to be cancelled especially can be damped by the construction that the weight is supported by the elastic body to form a dynamic damper. Thus, vibration damping effect can be obtained regarding plural resonance vibrations in a wide frequency range.

The weight may be provided within the elastic body. The weight can be supported by the elastic body integrally not touching the housing by the simple construction and the vibration damper can be made small and light.

Spring constant of the elastic body and weight of the weight may be set so that the dynamic damper cancels a specific frequency vibration. Owing to the construction that the elastic body is inserted within the housing fixed to the vibration transmitting member not bonded to the housing with a gap in a direction of vibration of the housing, vibration damping effect is obtainable regarding plural resonance vibrations of different frequencies, and also vibration in a frequency region which can not be damped by the construction or vibration of a specific frequency to be damped especially can be damped by the dynamic damper.

The above-mentioned specific frequency vibration may be a low frequency vibration. According to the construction that the elastic body is inserted within the housing fixed to the vibration transmitting member not bonded to the housing with a gap in a direction of vibration of the housing, vibration is damped based on energy loss caused by sliding friction and impact, therefore the vibration damping effect is larger especially in a high frequency resonance region.

Therefore, regarding a low frequency resonance region, vibration damping property is obtained by suitably setting spring constant of the elastic body and weight of the weight in the dynamic damper. Thus, vibration damping effect can be obtained regarding plural resonance vibrations in substantially overall frequency region.

According to another aspect of the invention, there is provided a vibration damper, comprising a housing formed in a cylinder from a rigid material, having an internal space, and fixed to a steering wheel with axis of the cylinder directed substantially in parallel with a steering shaft; an elastic body inserted in the internal space not bonded to the housing with a gap in a direction of vibration of the housing; and a weight integrally supported by the elastic body so as not to touch the housing.

Owing to the construction that the housing is fixed to the steering wheel with axis of the cylinder directed substantially in parallel with the steering shaft and the elastic body is inserted in the internal space not bonded to the housing with a gap in a direction of vibration of the housing, the elastic body touches an inner surface of the housing corresponding to vibration in the direction perpendicular to the steering shaft of the steering wheel to suppress the vibration based on energy loss caused by sliding friction and impact. Therefore, vibration damping effect is obtained regarding plural resonance vibrations of different frequencies. An exact setting of the resonance frequency, which is necessary in a dynamic damper, is not necessary so that deviation of the resonance frequency on mass-production can be reduced. Since vibration damping effect is obtained effectively by the weight of relatively small mass, the vibration damper can be applied to a steering wheel easily.

In the last-mentioned vibration damper, a plurality of the weights may be provided. Even if the total mass of the weights is the same as a mass of a weight in a case having single weight, vibration is damped more and degree of freedom for layout of the weight is improved.

In the above-mentioned vibration damper, a plurality of the elastic bodies each supporting the weight may be provided. Each elastic body integrally supporting the weight is small, so that degree of freedom of layout and shape of the housing is high.

The elastic body and the weight may form a dynamic damper. While plural resonance vibrations of different frequencies can be damped generally, the dynamic damper is capable of damping a specific frequency necessitating to be damped especially, therefore vibrations in a wide frequency region can be damped more effectively.

BRIEF DESCRIPTION OF THE DRAWINGS

FIG. 2-*a* and FIG. 2-*b* are schematic views showing a main vibration system and a damper construction;

FIG. 9-*a* and FIG. 9-*b* are schematic views showing a main vibration system and a damper construction;

FIG. 10-*a* and FIG. 10-*b* are views for explaining that the vibration system differs according to the number of weights.

DETAILED DESCRIPTION OF THE PREFERRED EMBODIMENT

Figure 1:
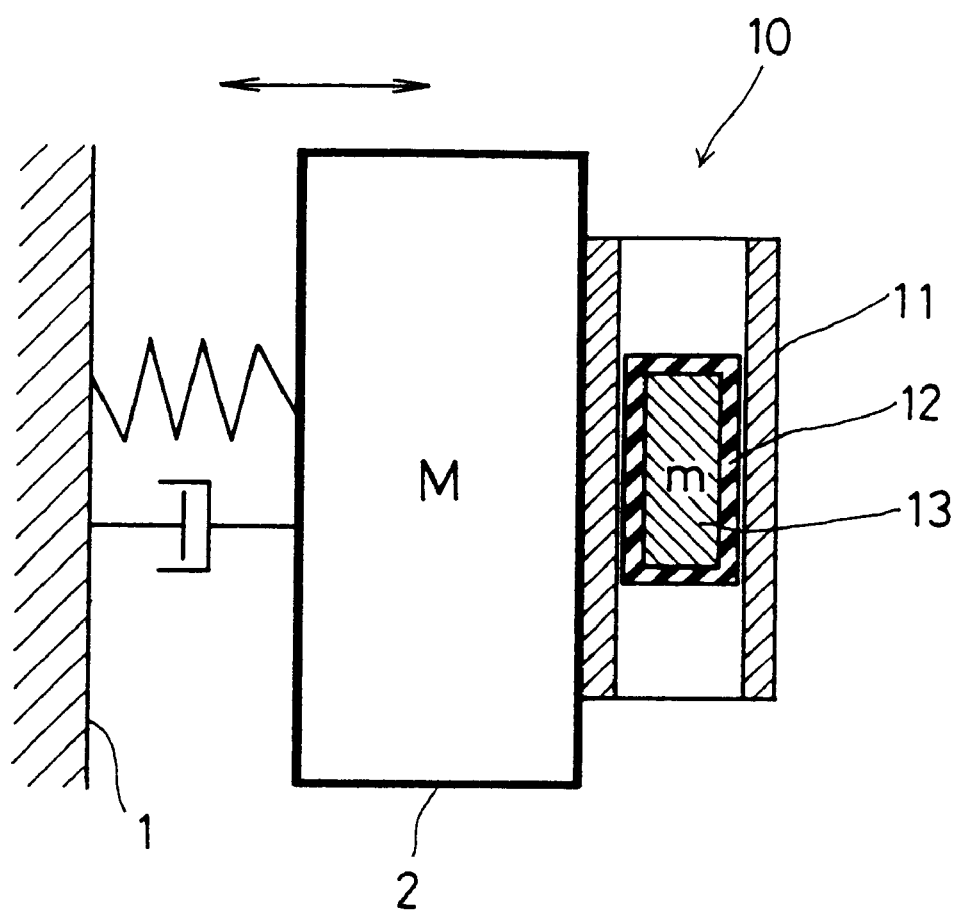
FIG. 1 is a schematic view of a vibration damper according to an embodiment of the present invention provided on a vibration transmitting member.

Hereinafter, an embodiment of the present invention will be described with reference to FIGS. 1 to 3. As shown in FIG. 1, in this embodiment, a main vibration system is constituted by a vibration source 1 such as a body frame of a motorcar, and a vibration transmitting member 2 such as a subsidiary machine, an intake pipe, an exhaust pipe, a sub-frame, an arm member or a bracket member. A vibration damper 10 of the present invention is provided on the vibration transmitting member 2 as a subsidiary vibration system.

The vibration damper 10 has a cylindrical housing 11 and a columnar elastic body 12 inserted within the housing 11 not bonded to the housing with a gap. Within the elastic body 12 is embedded a weight 13 having mass of m.

The housing 11 constituting the subsidiary vibration system is integrally fixed to the vibration transmitting member 2, having mass of M, of the main vibration system. Direction of vibration of the vibration transmitting member 2 is shown in FIG. 1 by the horizontal arrow. The gap d between the housing 11 and the elastic body 12 (see FIG. 2-*a*) is provided in the same direction as the above direction of vibration.

The housing 11 is formed of a rigid material. It needs only to have an internal space for inserting the elastic body 12 with the gap d. Namely, shape of the housing 11 is not limited to cylindrical but may be a square pipe or any other shape. Usually, the housing 11 has a construction for enclosing the inserted elastic body 12 so as not drop out.

The elastic body 12 is formed of rubber, resin or elastic formed material containing those as chief ingredient. A rubber of high specific weight is suitable. The elastic body 12 has a smooth flat or curved surface, but the surface of the elastic body 12 may be uneven. The elastic body 12 has a specific spring constant k.

The weight 13 embedded in the elastic body 12 is made of steel and has mass of m. Material of the weight is not limited to steel but may be various materials having high density.

In the subsidiary vibration system constructed as mentioned above, there exist together a damper (called as impact damper in the following) constituted by the elastic body 12 inserted within the housing 11 not bonded to the housing with the gap d in the direction of vibration of the housing, and a dynamic damper constituted by the weight 13 of mass m embedded within the elastic body 12.

FIG. 2-*a* shows the main vibration system and the impact damper schematically, and FIG. 2-*b* shows the main vibration system and the dynamic damper schematically.

Referring to FIG. 2-*a* showing the impact damper, when the housing 11 vibrates together with the vibration transmitting member 2, the elastic body 12 inserted in the inner space of the housing 11 with the gap d moves relatively to the housing 11 and strike against an inner surface of the housing 11 accompanying slide friction and impact. And vibration damping effect is obtained based on energy loss caused by the sliding friction and the impact.

Figure 3:
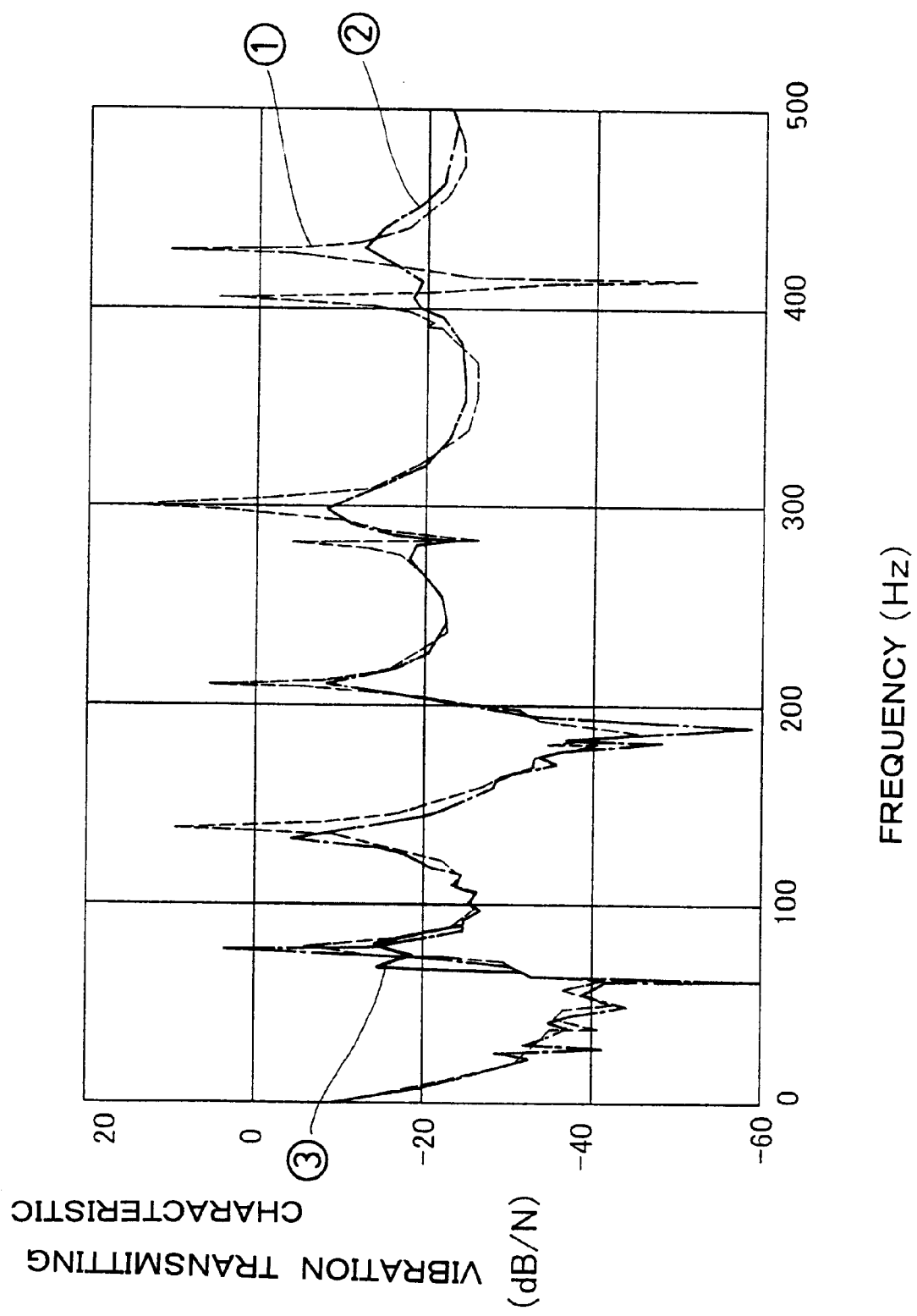
FIG. 3 is a graph showing vibration transmitting characteristics.

In FIG. 3 showing vibration characteristics of the vibration transmitting member 2, the broken line shows vibration transmitting characteristic when no vibration damper is provided. Peaks appear at many resonance frequencies in a wide region extending from a low frequency to a high frequency.

The dot-dash line shows vibration transmitting characteristic when the impact damper is provided. Compared with the broken line, levels of the peaks at the resonance frequencies are suppressed low in general, and particularly, resonance peak levels on the high frequency side are reduced largely. The reason is that since the impact damper is based on energy loss caused by sliding friction and impact, vibration damping effect becomes larger as speed of striking of the elastic body 12 against the inner surface of the housing 11 increases, so that the vibration damping effect is large particularly in resonance regions of high frequency.

Compared with this, a resonance peak level at a low frequency (about 80 Hz) is not reduced but rather increased. Therefore, the vibration damper 1 is provided with the dynamic damper in addition to the impact damper As shown in FIG. 2-b, in the dynamic damper, the weight 13 of mass m is connected to the housing 11 fixed to the vibration transmitting member 2 through the elastic body 12 of spring constant k. The mass m of the weight 13 and the spring constant k of the elastic body 12 are set so as to exhibit vibration damping effect particularly in the low frequency region of about 80 Hz. Namely, they are set so that the natural frequency of the main vibration system and the natural frequency of the subsidiary vibration system coincide with each other.

As the result, a particularly high resonance peak at frequency of about 80 Hz of the vibration transmitting characteristic shown by the dot-dash line in FIG. 3 is largely reduced as shown by the solid line. Regarding other frequencies, the characteristic remains as that of the dot-dash line Thus, in the vibration damper 1 exist together an impact damper and a dynamic damper so as to supplement defect of each other, so that many resonance peak levels in overall frequency region from low frequency to high frequency can be lowered. Since vibrations at many resonance frequencies can be reduced, lowering of function of the vibration transmitting member 2 and generation of noise can be prevented.

The impact damper, which reduces plural resonance peak levels based on energy loss caused by sliding friction and impact, is hardly influenced by temperature, therefore the vibration damping effect is not lowered by temperature.

After vibrations of plural resonance frequencies are damped by the impact damper, sometimes a particular resonance frequency among the damped resonance frequencies is required to be further damped. Even in such a case, the required resonance frequency can be damped further by the dynamic damper to cope with various uses.

Since the dynamic damper effect can be obtained by embedding the weight 13 in the elastic body 12 of the impact damper, the vibration damper is simple in construction and can be made small and of low cost.

Figure 4:
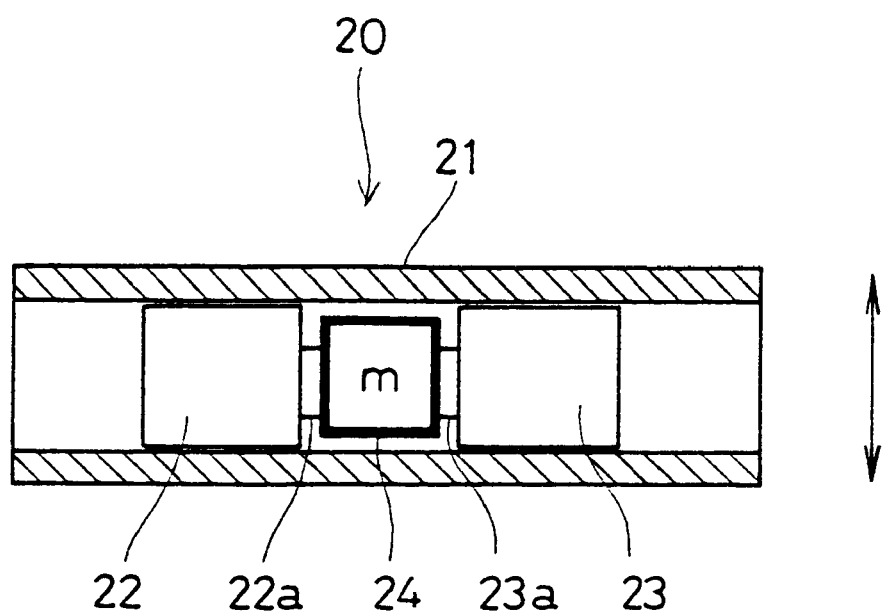
FIG. 4 is a schematic view of a vibration damper according to another embodiment.

FIG. 4 shows a vibration damper 20 according to another embodiment of the invention schematically. In a cylindrical housing 21 to be attached to a vibration transmitting member are inserted a pair of elastic bodies 22, 23 and a weight 24 supported by the elastic bodies 22, 23.

Each elastic body 22, 23 is shaped in a column having a diameter somewhat smaller than the inner diameter of the housing 21. The elastic bodies 22, 23 are arranged coaxially and have respective supporting sections 22a, 23a projecting from opposing faces of the elastic bodies 22, 23, and the weight 24 is fixed to tip ends of the supporting sections 22a, 23a by baking so that the weight 24 is fixedly supported by the elastic bodies 22, 23 from the both sides.

The weight 24 is formed in a columnar shape having an outer diameter smaller than that of the elastic bodies 22, 23 and in coaxial with the elastic bodies 22, 23. Therefore, the weight 24 inserted in the housing 11 is elastically supported by the elastic bodies 22, 23 so as not to touch the housing 11.

The space between the inner surface of the housing 11 and the weight 24 is so wide that even if the weight 24 supported elastically is displaced relatively to the elastic bodies 22, 23, the weight 24 does not touch the housing 11.

Thus, the vibration damper 20 constitutes an impact damper in which the elastic bodies 22, 23 are inserted in the housing 21 not bonded thereto with a gap in a direction of vibration of the housing shown by the vertical arrow in FIG. 4, and a dynamic damper in which the weight 24 is elastically supported by the elastic bodies 22, 23.

The impact damper suppresses vibrations of plural resonance frequencies and the dynamic damper suppresses other resonance vibrations which can not be suppressed by the impact damper. Therefore, many resonance peak levels can be lowered in overall frequency region from low frequency to high frequency.

Therefore, it is possible that after vibrations of plural resonance frequencies are damped by the impact damper, a particular resonance frequency among the damped resonance frequencies is further damped.

The housing may be fixed to the vibration transmitting member by welding, screws or a special attachment tool, or the housing may be formed integrally with the vibration transmitting member. Or, in case that the vibration transmitting member is cylindrical having an internal space like a suspension arm, the vibration transmitting member itself may be used as a housing in a manner that an elastic body is inserted in the internal space with a gap.

Figure 5:
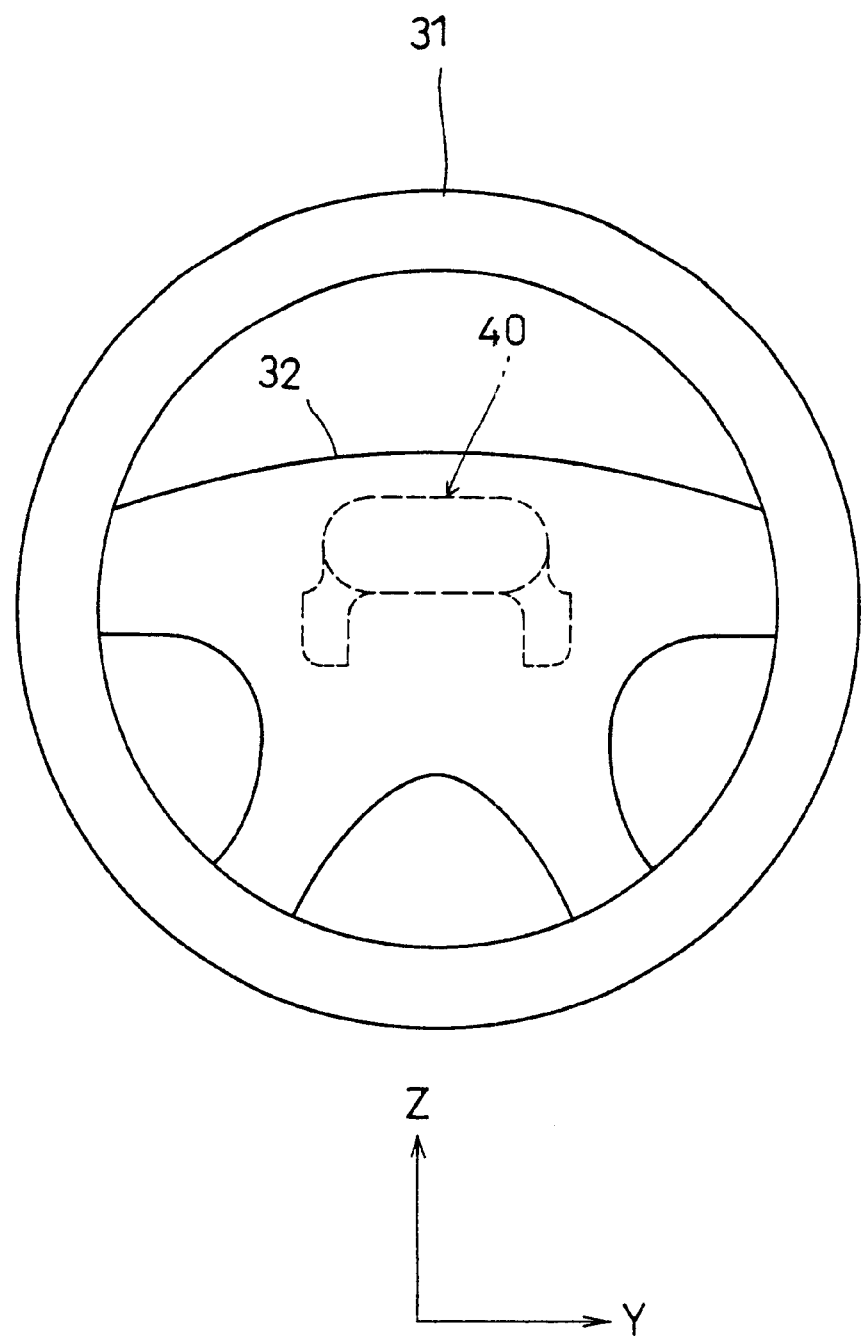
FIG. 5 is a front view of a steering wheel attached with a vibration damper according to further embodiment.

Next, a further embodiment applied to a steering wheel will be described with reference to FIGS. 5 to 8. FIG. 5 is a front view of the steering wheel 31 to which a vibration damper 40 according to the embodiment is attached.

The vibration damper 40 has an elliptical housing 41 elongated right and left in front view, and the housing 41 is fixed to a steering boss plate 32 about at a center of the steering wheel 31. In FIG. 5, the axis Y shows right-left direction and the axis Z shows upper-lower direction. An axis X (not shown) perpendicular to the paper face corresponds to direction of the steering shaft.

Figure 6:
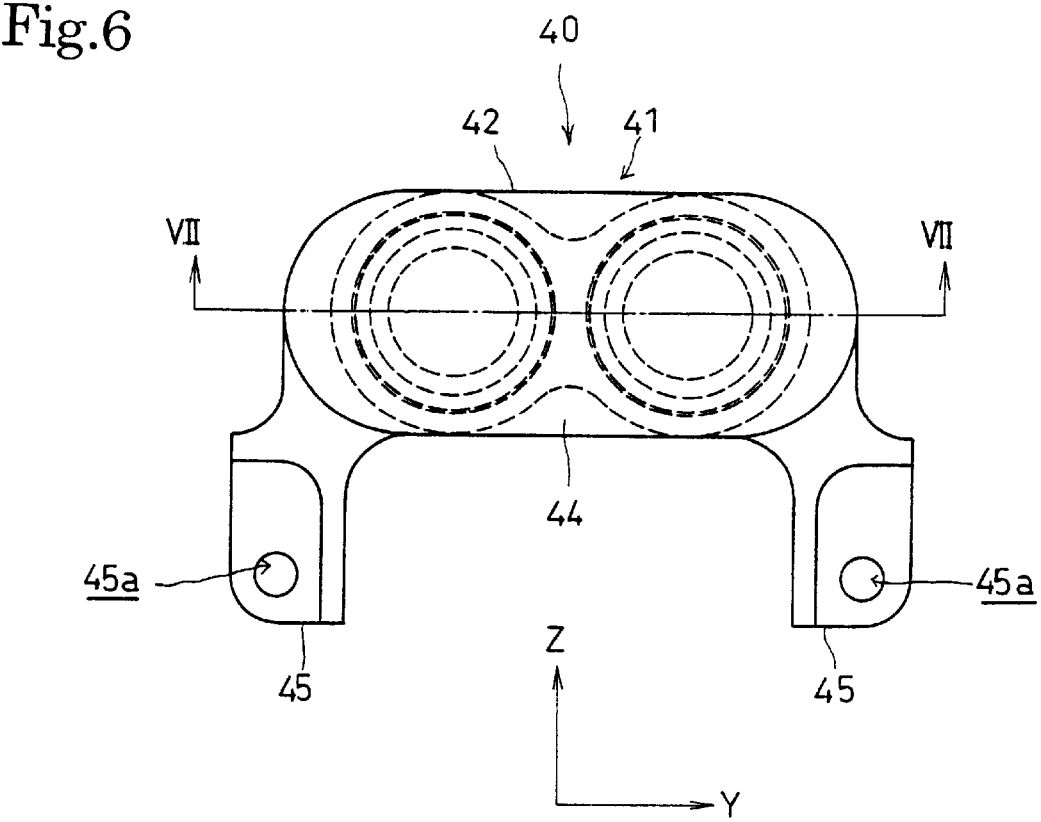
FIG. 6 is a front view of the vibration damper.
Figure 7:
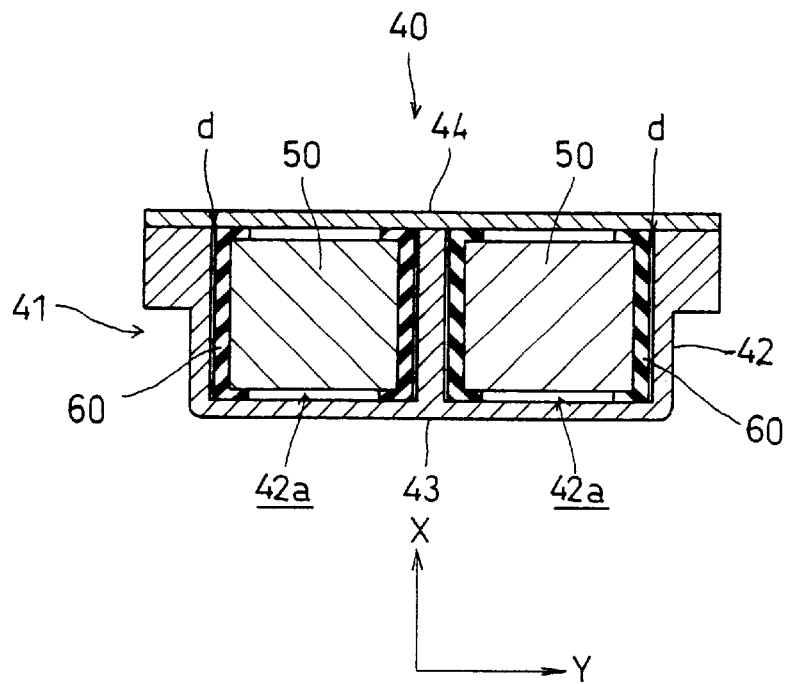
FIG. 7 is a sectional view taken along the line VII—VII of FIG. 6.

FIGS. 6, 7 show the vibration damper 40. The housing 41 is made of a rigid material and comprises an elliptical barrel-shaped body 42 having two columnar hollow portions (inner spaces) 42a, 42a arranged right and left with axes directed in parallel with each other, a bottom wall 43 and a plane lid member 44.

A pair of right and left brackets 45, 45 extend in the same direction (direction of Y-axis) from right and left ends of the barrel-shaped body 42 of the housing 41. Each bracket has an attachment hole 45a for bolting the housing 41 to the steering boss plate 32.

In each of the columnar hollow portion 42a of the housing 41 is inserted a columnar weight 50 covered with an elastic body 60. The elastic body 60 covers an outer circumferential surface and both end surfaces excluding central portions of the columnar weight 50 so that the weight 50 does not touch the barrel-shaped body 42 directly. Between the inner circumferential surface of the columnar hollow portion 42a and the outer circumferential surface of the elastic body 60 is formed a gap d.

The weight 50 is made of steel. But, material for the weight 50 is not limited to steel and various material of high density can be used for it. The elastic body 60 is formed of rubber, resin or elastic foamed material containing those as chief ingredient. A rubber of high specific gravity is suitable. The elastic body 60 has a smooth flat or curved surface, but the surface of the elastic body 60 may be uneven.

The above-mentioned vibration damper 40 is attached to the steering wheel 31 in the posture as shown in FIG. 5. The elastic body 60 inserted in the columnar hollow portion 42a of the housing 41 fixed to the steering boss plate 32 has the gap d which has its thickness in a direction parallel with the Y-Z plane, that is, in the direction of vibration perpendicular to that of the steering shaft (X-axis).

Figure 8:
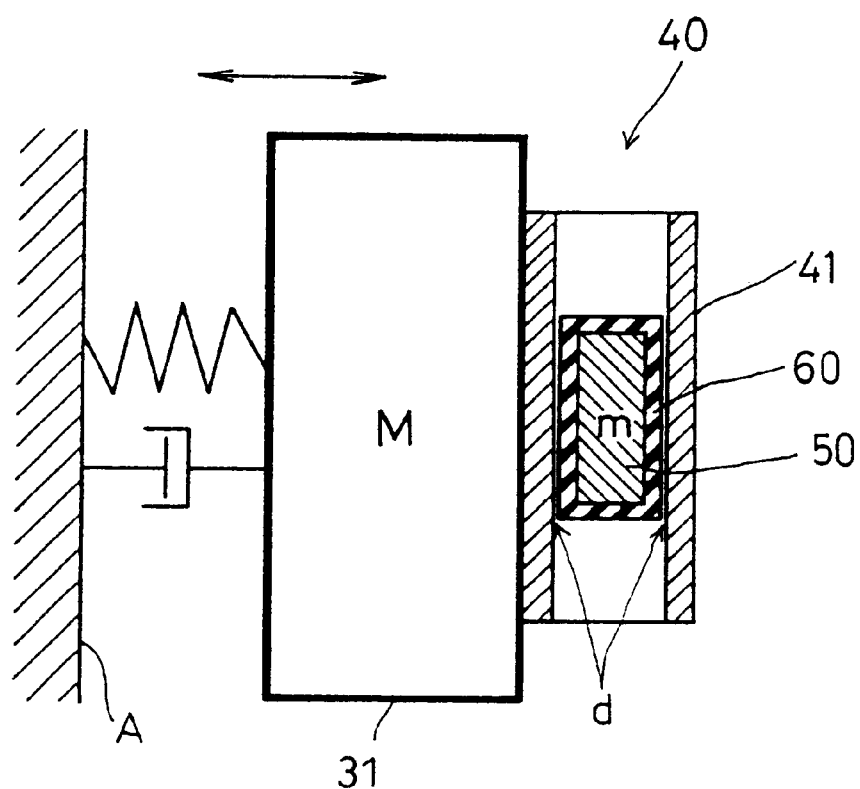
FIG. 8 is a schematic view showing the vibration damper provided on the steering wheel.

The vibration system of the steering wheel 31 and the vibration damper 40 can be shown schematically as FIG. 8 which is the same as FIG. 1. Namely, in a main vibration system in which the steering wheel 31 as a vibration transmitting member is attached to a vibration source such as a body frame, the vibration damper 40 is provided as a subsidiary vibration system on the steering wheel 31.

The housing 41 as a subsidiary vibration system is fixed to the steering wheel 31 (mass M) as a main vibration system, and in the subsidiary vibration system, between the housing 41 and the weight 50 (mass m) is formed the gap d in direction of the vibration shown by the horizontal arrow in FIG. 8.

Therefore, in the vibration damper 40 exist together an impact damper in which the elastic body 60 is inserted in the inner space 42a of the housing 41 not bonded thereto with the gap d in the direction of vibration, and a dynamic damper in which the weight 50 having mass of m is embedded within the elastic body 60.

The main vibration system and the impact damper can be shown schematically as FIG. 9-a which is the same as FIG. 2-a, and the main vibration system and the dynamic damper can be shown schematically as FIG. 9-b which is the same as FIG. 2-b.

Therefore, referring to FIG. 9-a regarding the impact damper, when the housing 41 vibrates together with the steering wheel 31, the elastic body 60 inserted in the inner space 42a with the gap d moves relatively to the housing 41 and strikes against an inner surface of the inner space 42a accompanying sliding friction and impact, and vibration damping effect is obtained based on energy loss caused by the sliding friction and the impact.

As shown in FIG. 9-b, the weight 50 of mass m is connected to the housing 41 fixed to the steering wheel 31 through the elastic body 60 of spring constant k to constitute the dynamic damper. The mass m of the weight 50 and the spring constant k of the elastic body 60 are set so as to exhibit vibration damping effect particularly in the low frequency region of about 80 Hz. Namely, they are set so that the natural frequency of the main vibration system and the natural frequency of the subsidiary vibration system coincide with each other.

Therefore, the steering wheel 31 has vibration transmitting characteristic as shown in FIG. 3. Namely, in the vibration transmitting characteristic corresponding to the case that the impact damper is provided, peak levels at plural resonance frequencies of the vibration transmitting characteristic is suppressed low in general.

The reason is that the vibrations are damped based on energy loss caused by sliding friction and impact of the elastic body 60. Therefore, peak levels at plural resonance frequencies can be suppressed low by the relatively small mass m and the vibration damper is suitable for the steering wheel 31. Since peak levels at many resonance frequencies spreading over from low frequency to high frequency is suppressed, deviation on mass-production can be reduced easily.

The impact damper is able to damp vibrations of steering wheel 31 in every directions along YZ-plane (directions perpendicular to the steering shaft).

Since the impact damper reduces plural resonance peak levels based on energy loss caused by sliding friction and impact, it is hardly influenced by temperature and its vibration damping effect is not lowered owing to temperature.

As shown in FIG. 3, the impact damper reduces the resonance peak level largely particularly on the high frequency side. The reason is that since the impact damper acts based on energy loss caused by sliding friction and impact, the vibration damping effect becomes larger as speed of striking of the elastic body 30 against the inner surface of the housing 11 increases, so that vibration damping effect is large particularly in resonance region of high frequency.

Compared with this, a resonance peak level at a low frequency (about 80 Hz) is not reduced. Therefore, the vibration damper 10 is provided with the dynamic damper in addition to the impact damper. In the dynamic damper, mass m of the weight 20 and spring constant k of the elastic body 30 are selected so as to exhibit vibration damping effect particularly at the low frequency region of about 80 Hz.

Therefore, a particularly high resonance peak at frequency of about 80 Hz of the vibration transmitting characteristic shown by the dot-dash line in FIG. 3 is largely reduced as shown by the solid line. Regarding other frequencies, the characteristic remains as that of the dot-dash line.

Thus, after the impact damper has damped vibrations regarding plural resonance frequencies, the dynamic damper damps resonance vibration regarding a frequency showing a high resonance peak level still or a frequency at which more vibration damping is desired.

In the vibration damper 40 having the two elastic bodies 60 each covering the weight 60 inserted in the respective inner spaces 42a, 42a of the housing 41, even if the total mass of the weights is the same as the case having single weight, vibration is damped more and degree of freedom for layout of the weight and shape of the housing is high.

FIG. 10-a shows schematically a case that two weights m1, m2 covered by elastic bodies d1, d2 are inserted in an inner space of a housing h, and FIG. 10-b shows schematically a case that a weight m3 covered by an elastic body d3 is inserted in the same inner surface of the housing h.

Supposing that in both cases the housing h is given vibration as shown by the arrows and weights m1, m2, m3 move as shown in FIG. 10, in case of single weight m3 (FIG. 10-b), the weight m3 touches the inner surface of the housing h through the elastic body d3 at one or two places, while in case of two weights m1, m2 (FIG. 10-a), the weights m1, m2 touch the inner surface of the housing h through the elastic bodies d1, d2 each one or two places. Therefore, vibration modes of the both cases are different from each other and vibration damping effect in the case of two weights m1, m2 is superior to the case of single weight m3.

The vibration damping effect and the degree of freedom of layout can be improved also by covering a plurality of weights with a elastic body. Further, a plurality of vibration dampers each having the elastic body covering the weight inserted in the inner space of the housing not bonded thereto with the gap in direction of vibration of the housing may be provided on the steering wheel.

The vibration damper 20 shown in FIG. 4 is also applicable to the steering wheel. In this case, the vibration damper 20 is fixed to the steering wheel with axis of the cylindrical housing 21 directed in parallel with the steering shaft, so that direction of vibration of the steering wheel perpendicular to the steering shaft coincides with direction of the arrow shown in FIG. 4. Thus, an impact damper having the elastic bodies 22, 23 inserted within the housing 21 not bonded thereto with the gap in direction of vibration of the housing 21 is constituted, thereby the weight 24 elastically supported by the elastic bodies 22, 23 constitutes a dynamic damper.

Therefore, the impact damper damps plural resonance vibrations and the dynamic damper damps another resonance vibration which can not be damped by the impact damper, so that many resonance peak levels in overall frequency region from low frequency to high frequency can be lowered and deviation on mass-production can be reduced.

The present invention can be applied to various vibration transmitting member to which vibration is transmitted from a vibration source, besides vehicles such as a motorcar, an electric car and the like.

What is claimed is:

1. A vibration damper, comprising:

a housing formed of a rigid material, having an internal space and fixed to a vibration transmitting member;

an elastic body having a spring constant inserted in said internal space not bonded to said housing with a gap in a direction of vibration of said housing, said gap located between said elastic body and a wall bounding said internal space; and a weight having a mass integrally supported by said elastic body so as not to touch said housing, wherein, when the vibration damper is in use, a subsidiary vibration system including said housing, said elastic body and said weight is formed, said subsidiary vibration system being associated with a main vibration system, and said spring constant of said elastic body and said mass of said weight are set so that the natural frequency of said main vibration system and the natural frequency of said subsidiary vibration system coincide with each other and thereby said elastic body and said weight form a dynamic damper.

2. A vibration damper as claimed in claim 1, wherein said weight is provided within said elastic body.

3. A vibration damper as claimed in claim 1 or 2, wherein spring constant of said elastic body and weight of said weight are set so that said dynamic damper cancels a specific frequency vibration.

4. A vibration damper as claimed in claim 3, wherein said specific frequency vibration is a low frequency vibration.

5. A vibration damper, comprising a housing formed in a cylinder from a rigid material, having an internal space, and fixed to a steering wheel with axis of said cylinder directed substantially in parallel with a steering shaft;

an elastic body inserted in said internal space not bonded to said housing with a gap in a direction of vibration of said housing; and a weight integrally supported by said elastic body so as not to touch said housing.

6. A vibration damper as claimed in claim 5, wherein a plurality of said weights are provided.

7. A vibration damper as claimed in claim 6, wherein a plurality of said elastic bodies, each supporting one of said plurality of weights, are provided.

8. A vibration damper as claimed in claim 5, 6 or 7, wherein said elastic body and said weight form a dynamic damper.

* * * * *